(12) United States Patent
Shao et al.

(10) Patent No.: US 11,275,248 B2
(45) Date of Patent: Mar. 15, 2022

(54) HEAD MOUNTED DISPLAY APPARATUS, VIRTUAL REALITY DISPLAY SYSTEM AND DRIVING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Jian Sun, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/756,597

(22) PCT Filed: Nov. 28, 2019

(86) PCT No.: PCT/CN2019/121574
§ 371 (c)(1),
(2) Date: Apr. 16, 2020

(87) PCT Pub. No.: WO2020/140657
PCT Pub. Date: Jul. 9, 2020

(65) Prior Publication Data
US 2021/0208398 A1 Jul. 8, 2021

(30) Foreign Application Priority Data
Jan. 2, 2019 (CN) .......................... 201910002874.3

(51) Int. Cl.
*G02B 27/01* (2006.01)
*G06F 3/01* (2006.01)

(52) U.S. Cl.
CPC ..... *G02B 27/0172* (2013.01); *G02B 27/0179* (2013.01); *G06F 3/012* (2013.01); *G02B 2027/0187* (2013.01)

(58) Field of Classification Search
CPC ............ G02B 27/0172; G02B 27/0179; G02B 2027/0187; G06F 3/012
See application file for complete search history.

(56) References Cited

U.S. PATENT DOCUMENTS 9,479,682 B2 * 10/2016 Hohjoh .................... G09G 5/00
2010/0123698 A1 * 5/2010 Park .................... G09G 3/3648
345/208

(Continued)

FOREIGN PATENT DOCUMENTS

CN 106998409 A 8/2017
CN 107680047 A 2/2018

(Continued)

OTHER PUBLICATIONS

Zheng et al., Translation of CN 106998409 A, Aug. 1, 2017 (Year: 2017).*

(Continued)

*Primary Examiner* — Dmitriy Bolotin
(74) *Attorney, Agent, or Firm* — Westerman, Hattori, Daniels & Adrian, LLP (57) ABSTRACT

The present disclosure relates to a driving method of a head mounted display apparatus. The driving method may include: acquiring posture information of a head mounted display apparatus in real time using a posture detector; acquiring data of a first image, determining first posture information corresponding to the first image and second (Continued)

posture information corresponding to a second image based on the posture information provided by the posture detector, and determining data of the second image based on the data of the first image, the first posture information and the second posture information, wherein the data of the first image is provided by a main processor, and the second image is an interpolated frame image obtained by rendering the first image; and displaying the first image and the second image sequentially using a display device.

17 Claims, 7 Drawing Sheets

(56) References Cited

U.S. PATENT DOCUMENTS

| | | | |
|---|---|---|---|
| 2016/0048976 A1 | 2/2016 | Kwon et al. | |
| 2016/0091720 A1* | 3/2016 | Stafford | G02B 27/0093 345/8 |
| 2016/0093105 A1* | 3/2016 | Rimon | G06T 11/60 345/633 |
| 2016/0175702 A1* | 6/2016 | Black | G06T 19/006 463/31 |
| 2016/0299563 A1* | 10/2016 | Stafford | G06F 3/011 |
| 2016/0328881 A1* | 11/2016 | Ozeki | G06F 1/163 |
| 2017/0018056 A1* | 1/2017 | Holzer | G06K 9/00664 |
| 2017/0339391 A1* | 11/2017 | Zhou | H04L 65/607 |
| 2018/0075661 A1 | 3/2018 | Jiang et al. | |
| 2019/0051051 A1* | 2/2019 | Kaufman | G06F 3/01 |
| 2020/0209625 A1* | 7/2020 | Takeda | G06F 3/011 |
| 2020/0213580 A1* | 7/2020 | Takeda | G02B 27/017 |

FOREIGN PATENT DOCUMENTS

| | | |
|---|---|---|
| CN | 109375764 A | 2/2019 |
| CN | 109725730 A | 5/2019 |

OTHER PUBLICATIONS

International Search Report dated Feb. 28, 2020, issued in counterpart Application No. PCT/CN2019/121574. (11 pages).
Office Action dated Dec. 16, 2019, issued in counterpart CN Application No. 201910002874.3, with English Translation. (13 pages).
Office Action dated Mar. 30, 2020, issued in counterpart CN Application No. 201910002874.3, with English Translation. (13 pages).
Office Action dated Aug. 4, 2020, issued in counterpart CN Application No. 201910002874.3, with English Translation. (16 pages).

* cited by examiner

FIG. 7

HEAD MOUNTED DISPLAY APPARATUS, VIRTUAL REALITY DISPLAY SYSTEM AND DRIVING METHOD THEREOF

CROSS-REFERENCE TO RELATED APPLICATIONS

This application claims benefit of the filing date of Chinese Patent Application No. 201910002874.3 filed on Jan. 2, 2019, the disclosure of which is hereby incorporated in its entirety by reference.

TECHNICAL FIELD

The present disclosure relates to display technologies, and in particular, to a head mounted display apparatus, a driving method of the head mounted display apparatus, a display system, and a driving method of the display system.

BACKGROUND

Virtual reality technology can create a virtual world and provide virtual world experience in a computer simulation system. It uses computers to generate a simulated environment. A multi-source information fusion, interactive three-dimensional dynamic visual scene and system simulation of the entity's behavior can immerse users into the environment Currently, virtual reality technology is mainly implemented by a main processor and a head mounted display apparatus that communicates with the main processor. The main processor renders and interpolates images based on the posture of the head mounted display apparatus and provides the processed images to the head mounted display apparatus for display. However, in some situations, complex scenes and high frame rates demand high requirements for image rendering and data transmission, which would be limited by the existing capabilities of the main processor. During rendering, if the rendering capacity of the main processor is insufficient for the data of a frame in cases such as complex image content, long rendering time and high output frame rate, the data of the next frame may be discarded. As a result, the head mounted display apparatus may display the same image from the previous frame, which causes display abnormality.

BRIEF SUMMARY

One embodiment is a driving method of a head mounted display apparatus. The driving method may include: acquiring posture information of a head mounted display apparatus in real time using a posture detector; acquiring data of a first image, determining first posture information corresponding to the first image and second posture information corresponding to a second image based on the posture information provided by the posture detector, and determining data of the second image based on the data of the first image, the first posture information and the second posture information, wherein the data of the first image is provided by a main processor, and the second image is an interpolated frame image obtained by rendering the first image; and displaying the first image and the second image sequentially using a display device.

Optionally, acquiring data of the first image, and determining the first posture information corresponding to the first image and the second posture information corresponding to the second image based on the posture information provided by the posture detector, and determining the data of the second image based on the data of the first image, the first posture information and the second posture information may include:

extracting the data of the first image from a storage module;

acquiring posture change data of the second posture information with respect to the first posture information, wherein the posture change data includes at least one of a heading angle change, a pitch angle change, and a displacement amount in each direction; and processing the data of the first image based on the posture change data to obtain the data of the second image.

Another embodiment of the present disclosure is a bead mounted display apparatus. The head mounted display apparatus may include: a display screen;

a processor; and a storage medium coupled to the processor and storing a computer program that, when executed by the processor, causes the processor to excute the driving method.

Another embodiment of the present disclosure is a head mounted display apparatus. The head mounted display apparatus may include: a posture detector, configured to acquire posture information of the head mounted display apparatus in real time; an image processor, configured to acquire data of a first image, determine first posture information corresponding to the first image and second posture information corresponding to a second image based on the posture information provided by the posture detector, and determine data of the second image based on the data of the first image, the first posture information and the second posture information; and a display device, configured to display the first image and the second image sequentially, wherein the second image is an interpolated frame image obtained by rendering the first image.

Optionally, the head mounted display apparatus may further include a storage module, configured to store the data of the first image provided by a main processor and the data of the second image provided by the image processor.

Optionally, the image processor may be configured to: extract the data of the first image from the storage module; acquire posture change data of the second posture information with respect to the first posture information, wherein the posture change data includes at least one of a heading angle change, a pitch angle change, or a displacement amount in each direction; and process the data of the first image based on the posture change data to obtain the data of the second image.

Optionally, the image processor may be further configured to: perform an offsetting, rotating, and/or scaling process on the first image in a corresponding direction based on the posture change data; and perform a cropping process on a portion of the data of the first image that is outside a preset area after the offsetting, rotating, and/or scaling processing, and perform data augmentation on an image missing area in the preset area.

Optionally, the head mounted display apparatus may further include an anti-distortion circuit configured to perform an anti-distortion process on the data of the first image and the data of the second image and provide the data of the first image and the data of the second image after the anti-distortion process to the display device.

Optionally, the posture detector may include one or a combination of an inertial measuring unit, an optical sensor, a positioning unit, or a camera ranging unit.

Optionally, the image processor may include a field-programmable gate array, a central processing unit, a processing chip or a microcontroller unit.

Optionally, the display device may include a display screen, a liquid crystal display panel, an organic light emitting diode display panel, or a display device based on a liquid crystal on silicon.

Optionally, the storage module may include a memory, a hard disk, a floppy disk, or a memory chip.

Another embodiment of the present disclosure is a virtual reality display system. The virtual reality display system may include a main processor and the head mounted display apparatus in communication with the main processor. The head mounted display apparatus may be configured to acquire the posture information of the head mounted display apparatus in real time, and provide the first posture information corresponding to the first image to the main processor. The main processor may be configured to render the first image according to the first posture information provided by the head mounted display apparatus, and provide the data of the first image after rendering to the head mounted display apparatus.

Optionally, the main processor may be independently set from the head mounted display apparatus.

Optionally, the main processor and the head mounted display apparatus may perform data transmission via a data line or wirelessly.

Optionally, the main processor may include a mobile terminal, a PC terminal or a cloud processor.

Another embodiment is a driving method of the virtual reality display system. The driving method may include:

acquiring the posture information of the head mounted display device in real time using the posture detector;

rendering the data of the first image by the main processor based on the first posture information provided by the posture detector, and providing the data of the first image after rendering to the storage module and the image processor;

acquiring the data of the first image by the image processor, determining the first posture information corresponding to the first image and the second posture information corresponding to the second image based on the posture information provided by the posture detector, and determining the data of the second image based on the data of the first image, the first posture information and the second posture information; and displaying the first image and the second image sequentially by the display device.

Optionally, the data of the first image may be provided by the main processor, and the second image is an interpolated frame image obtained by rendering the first image by the head mounted display apparatus.

BRIEF DESCRIPTION OF THE DRAWINGS

The drawings are intended to provide a further understanding of the technical solutions of the present disclosure, and are intended to be a part of the specification, and are used to explain the technical solutions of the present disclosure, and do not constitute a limitation of the technical solutions of the present disclosure.

DETAILED DESCRIPTION

Some embodiments of the present disclosure provide a head mounted display apparatus, a driving method of the head mounted display apparatus, a virtual reality display system, and a driving method of the virtual reality display system. The present disclosure will be further described in detail with reference to the accompanying drawings. In the description of the following embodiments, specific features, structures, materials or characteristics may be combined in any suitable manner in any one or more embodiments or examples.

The shapes and sizes of the various components in the drawings do not reflect true proportions and are merely intended to illustrate the present disclosure.

Figure 1:
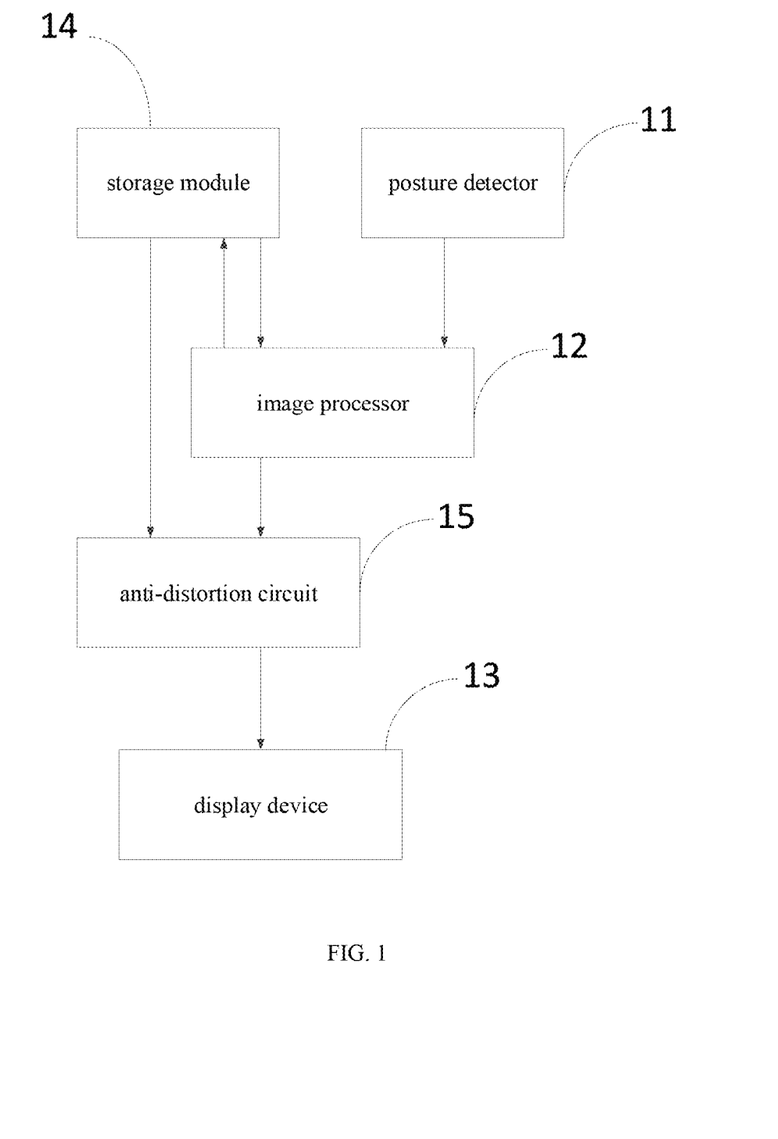
FIG. 1 is a schematic diagram of a head mounted display apparatus according to one embodiment of the present disclosure.

One embodiment of the present disclosure provides a head mounted display apparatus, as shown in FIG. 1, including a posture detector 11, an image processor 12, and a display device 13.

The posture detector 11 is used to acquire posture information of the head mounted display apparatus in real time.

The image processor 12 is used to acquire data of a first image, determine first posture information corresponding to the first image and second posture information corresponding to a second image based on the posture information provided by the posture detector 11, and determine data of the second image based on the data of the first image, the first posture information and the second posture information. The data of the first image is provided by the main processor, and the second image is an interpolated frame image obtained by rendering the first image.

The display device 13 is used to display the first image and the second image sequentially.

Optionally, in the head mounted display apparatus according to one embodiment of the present disclosure, the posture detector may include one or a combination of an inertial measurement unit, an optical sensor, a positioning unit, and a camera ranging unit, or any other components capable of performing a posture detection function, but not limited hereto. The image processor may include a field-programmable gate array (FPGA), a central processing unit (CPU), a processing chip or a microcontroller unit (MCU), or any other components capable of performing an image processing function, but not limited hereto. The display device may be any display device capable of performing a display function, such as a display screen, a display panel, etc., and may include, optionally, a liquid crystal display (LCD), an organic light emitting diode display (OLED), a display device based on a liquid crystal on silicon (LCOS), or the like, but not limited hereto.

In one embodiment, the head mounted display apparatus includes a posture detector, an image processor, and a display device. The posture detector is used to acquire the posture information of the head mounted display apparatus in real time. The image processor is used to acquire the data of the first image, and determine the first posture information corresponding to the first image and the second posture information corresponding to the second image based on the posture information provided by the posture detector, and determine the data of the second image based on the data of the first image, the first posture information and the second posture information. The data of the first image is provided by the main processor, and the second image is an interpolated frame image obtained by rendering the first image. The display device is used to display the first image and the second image sequentially. The head mounted display apparatus can determine the data of the second image based on the data of the first image provided by the main processor, the first posture information, and the second posture information, that is, the interpolated frame image is rendered by the head mounted display apparatus, thereby reducing the amount of data that the main processor needs to process to ensure normal display at high frame rates and complex scenes.

In one embodiment, the head mounted display apparatus monitors the posture information in real time, and multiple posture information exists during the rendering of a frame image. The first posture information is the posture information corresponding to the first image being displayed, which is predicted based on the real-time posture of the head mounted display apparatus. The second posture information is the posture information corresponding to the second image being displayed, which is predicted based on the real-time posture of the head mounted display apparatus.

In one embodiment, the main processor is independently set with respect to the head mounted display apparatus. The "independently set" herein may refer to functionally independently set. The specific physical location of the main processor may be determined according to the actual applications. The main processor may be a chip, a microprocessor, or the like placed inside the head mounted display apparatus, and may also be a terminal disposed outside the head mounted display apparatus, but not limited hereto.

Optionally, as shown in FIG. 1, the head mounted display apparatus further includes a storage module 14.

The storage module 14 is used to store the data of the first image provided by the main processor and the data of the second image provided by the image processor 12.

In one embodiment, the storage module stores the data of the first image provided by the main processor and the data of the second image that has been rendered by the display apparatus. During display, the data of the second image in the storage module is displayed according to the preset time sequence, thereby avoiding the problem of data loss due to real-time data transmission. The storage module may include a memory, a hard disk, a floppy disk, a memory chip, and the like. The storage module may be any other components that have a storage function and can be applied to the head mounted display apparatus, but not limited hereto.

Optionally, the image processor of the head mounted display apparatus may be used to:

extracting the data of the first image from the storage module;

determining posture change data of the second posture information with respect to the first posture information, where the posture change data includes at least one of a heading angle change, a pitch angle change, and a displacement amount in each direction;

obtaining the data of the second image by processing the data of the first image based on the posture change data.

The posture change data is not limited to the parameters of the heading angle change, the pitch angle change, and the displacement amount in each direction, and may include any other parameter capable of determining the posture data, but not limited hereto.

Figure 2:
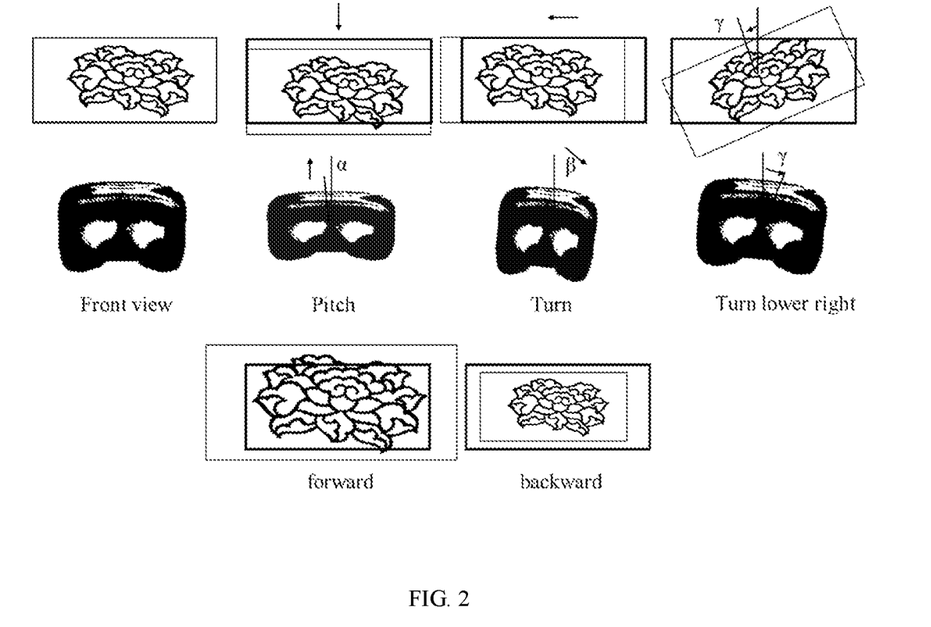
FIG. 2 is a schematic diagram of a head mounted display apparatus performing image processing according to one embodiment of the present disclosure.

In one embodiment, the image processor of the head mounted display apparatus may extract the data of the first image from the storage module, and processes the data of the first image, based on the posture change data of the second posture information with respect to the first posture information, to obtain the data of the second image. As shown in FIG. 2, the posture of the head mounted display apparatus such as front view, pitch, yaw, tilting, and leaning forward may change correspondingly the content of the scenes. When the head mounted display apparatus keeps facing the front, the scene remains unchanged. When the head mounted display apparatus pitches up, the line of sight moves upwards and correspondingly the scene being viewed shifts towards the top of the original. When the head mounted display apparatus turns left horizontally, the line of sight moves to the left and correspondingly the scene being viewed shifts to the left of the original. When the head mounted display apparatus moves forward, the corresponding scene being viewed is larger than the original.

Optionally, the image processor of the head mounted display apparatus may also be used to:

perform the offsetting, rotating, and/or scaling process on the first image in a corresponding direction based on the posture change data;

perform a cropping process on a portion of the first image that is outside of a preset area after the offsetting, rotating, and/or scaling process, and augment the data in an image missing area in the preset area.

In one embodiment, as shown in FIG. 2, the first image is located in the preset area (black frame area) when facing the front. After the first image is offset, rotated, and/or scaled, there are an image missing area within the preset area and a portion of image outside of the preset area. The portion of the image outside of the preset area will be cropped, that is, the corresponding data is removed. Data augmentation is performed on the image missing area. The data augmentation may be performed in two ways. One is that the data in the missing area can be simply set as black pixels if the image missing area is small, that is, the human eye cannot recognize the image missing area, which simplifies the data processing and reduce the amount of data for processing. The other is that the image missing area can be augmented based on the data of the image boundary adjacent to the image missing area if the image missing area is large, that is, the size of the image missing area can be clearly recognized by the human eye. Optionally, the data may be augmented by copying the adjacent boundary data to the image missing area or using processed data of the adjacent boundary for the image missing area.

In one embodiment, as shown in FIG. 2, during the time that the head mounted display apparatus changes from facing the front to pitching up, the content viewed at the next moment is the scene above at the previous moment. That is, the content of the scene at the next moment is the content at the previous moment after moving down. Correspondingly, after the image is moved, the lower data is cropped, and the upper data needs to be augmented. The black frame represents the reference image, i.e., the data of the first image. In other cases, the next moment content corresponding to the posture of the head mounted display apparatus is the content of the previous moment processed by a corresponding image processing. If the head mounted display apparatus yaws to the right, the scene shifts to the left, the left part of the image is cropped, and the data on the right is augmented. If the head mounted display apparatus tilts to the right, the corresponding scene is rotated to the lower left, the corner data out of the preset area is cropped, and the corner data that is missing is augmented. If the head mounted display apparatus moves forward, the corresponding scene is enlarged, and the surrounding data is cropped. If the head mounted display apparatus moves backward, the corresponding scene is reduced, and the surrounding data is augmented.

The change of the corresponding scene will not be significant in the head mounted display apparatus, since the moving distance or angle of the head mounted display apparatus per unit time such as the time corresponding to 120 Hz is small. If the data augmentation is necessary after the image changes, the augmented data is mostly in the surrounding area of the image. The surrounding area is not a primary view area and mostly deformed by the lens. Therefore, the augmented data may not cause any discomfort to users. Furthermore, the augmented data can be easily processed, for example, by copying the data of the surroundings or processing the data of the surroundings.

Optionally, the calculation of the translation or rotation offset in the head mounted display apparatus is described below with reference to FIG. 3 and FIG. 4.

Figure 3:
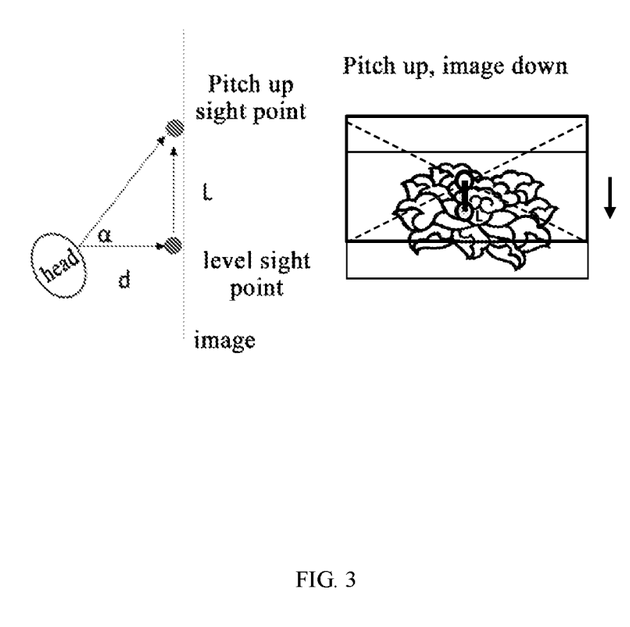
FIG. 3 is a schematic diagram of a head mounted display apparatus performing image processing according to one embodiment of the present disclosure.

As shown in FIG. 3, a is the pitch up angle of the head mounted display apparatus measured by a sensor, and d is a preset design value, i.e., a known value. The value of the line-of-sight movement, L, is calculated based on the values of the pitch up angle $\alpha$ and d. The data of the first image is translated based on the value of the line of sight movement L.

Figure 4:
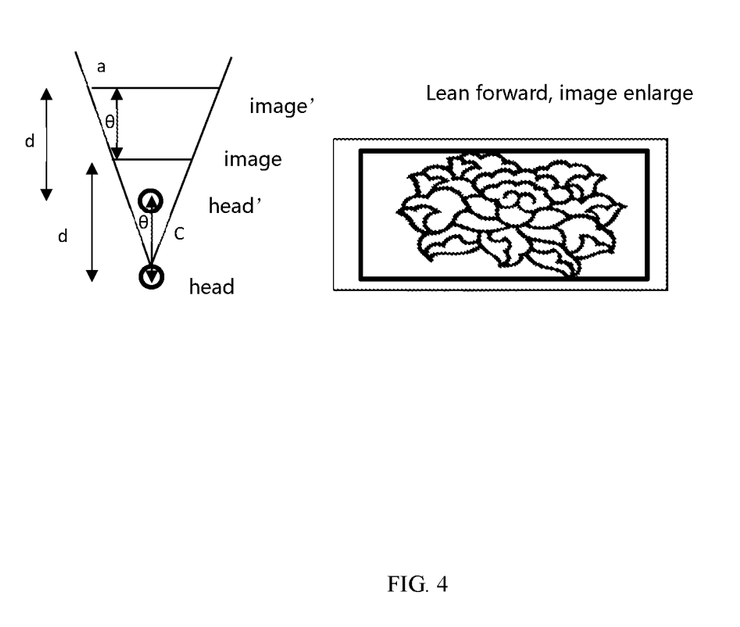
FIG. 4 is a schematic diagram of a head mounted display apparatus performing image processing according to one embodiment of the present disclosure.

As shown in FIG. 4, the advancing distance C and the angle of view $\theta$ of the head mounted display apparatus are measured by the sensor, and d is a preset design value, i.e., a known value. Based on the above data and the graphic size corresponding to the data of the first image, the size of the desired interpolated frame image is calculated. That is, the image enlargement ratio can be obtained, and then the portion outside of the preset area will be cropped.

It should be noted that the above is a process of calculating the posture change data using some posture changes as an example. The principle of other posture changes is the same as or similar to the principle of the above embodiments, and will not be repeated herein.

Optionally, the head mounted display apparatus, as shown in FIG. 1, further includes an anti-distortion module 15.

The anti-distortion module 15 is configured to perform anti-distortion processing on the data of the first image and the data of the second image, and provide the data after the processing to the display device 13.

In some embodiments, some of the head mounted display apparatuses are provided with a lens structure that may distort the display image. In order to correct the distortion, the anti-distortion module needs to perform an anti-distortion process to the data of the first image and the second image. If the head mounted display apparatus is not provided with such a structure that distorts images, the anti-distortion module may not be required, and the data of the image to be displayed may be directly provided to the display device for displaying.

Optionally, in one embodiment, the posture detector of the head mounted display apparatus includes one or a combination of an inertial measurement unit, an optical sensor, a positioning unit, and a camera ranging unit, or includes other units or components for detecting the posture, but not limited hereto.

Figure 5:
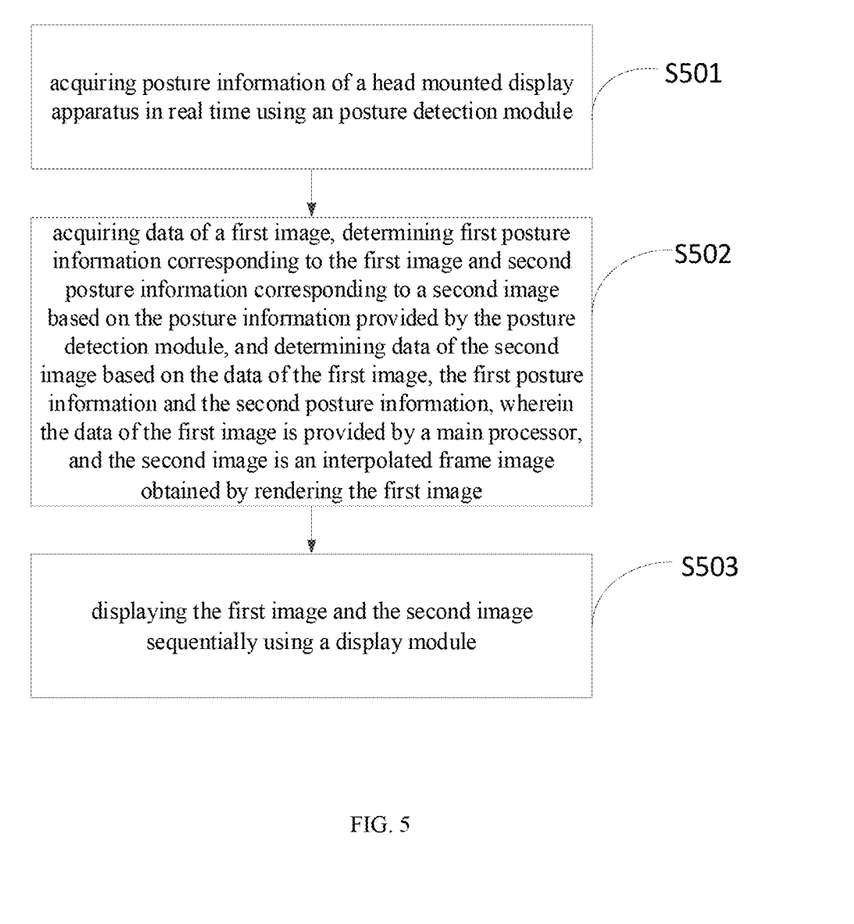
FIG. 5 is a flowchart of a driving method for a head mounted display apparatus according to one embodiment of the present disclosure.

As shown in FIG. 5, another embodiment of the present disclosure further provides a driving method of a head mounted display apparatus, including:

Step S501: acquiring posture information of the head mounted display apparatus in real time by the posture detector.

Step S502: acquiring data of the first image by the image processor, determining the first posture information corresponding to the first image and the second posture information corresponding to the second image based on the posture information provided by the posture detector, and determining data of the second image based on the data of the first image, the first posture information and the second posture information. The data of the first image is provided by a main processor, and the second image is an interpolated frame image obtained by rendering the first image.

Step S503: sequentially displaying the first image and the second image by the display device.

Optionally, in one embodiment, the step of acquiring the data of the first image by the image processor, determining the first posture information corresponding to the first image and the second posture information corresponding to the second image based on the posture information provided by the posture detector, and determining the data of the second image based on the data of the first image, the first posture information and the second posture information includes:

extracting the data of the first image from the storage module;

determining posture change data of the second posture information with respect to the first posture information, where the posture change data includes at least one of a heading angle change, a pitch angle change, or a displacement amount in each direction;

obtaining the data of the second image by processing the data of the first image based on the posture change data.

The driving principle and the specific implementation of the driving method of the head mounted display apparatus are the same as or similar to the principle and the implementation of the head mounted display apparatus in the above embodiments. Therefore, the driving method of the head mounted display apparatus may refer to the above embodiments, and the details are not repeated herein.

Figure 6:
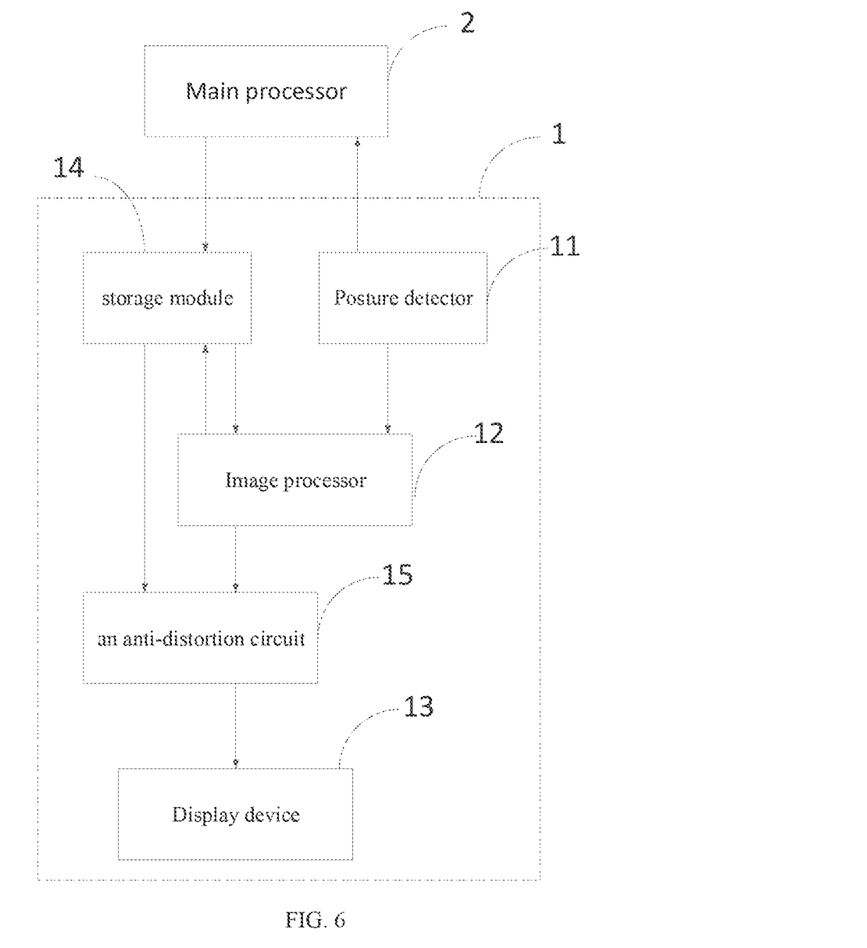
FIG. 6 is a schematic diagram of a virtual reality display system according to one embodiment of the present disclosure.

Based on some embodiments, as shown in FIG. 6, another embodiment of the present disclosure further provides a virtual reality display system, including a main processor 2, and a head mounted display apparatus in communication with the main process 2, as provided in any of the above embodiments.

The head mounted display apparatus 1 is used to acquire the posture information of the head mounted display apparatus in real time, and provide the first posture information corresponding to the first image to the main processor 2.

The main processor 2 is used to render the first image based on the first posture information provided by the head mounted display apparatus 1 and provide the data of the rendered first image to the head mounted display apparatus 1.

In one embodiment, the main processor of the virtual reality display system renders the first image based on the first posture information provided by the head mounted display apparatus and provides the data of the rendered first image to the head mounted display apparatus. The second image (an interpolated frame image) is rendered by the head mounted display apparatus, and the main processor does not need to render the interpolated frame image, thereby reducing the amount of processing data required by the main processor and also reducing data interaction between the main processor and the head mounted display apparatus so as to avoid abnormal display due to loss of frame data.

The principle of operation and the specific implementation of the head mounted display apparatus may refer to some embodiments provided by the above-mentioned head mounted display apparatus, and details are not repeated herein.

Optionally, the main processor and the head mounted display apparatus in the virtual reality display system perform data transmission through a data line or in a wireless manner.

Optionally, the main processor in the virtual reality display system includes a mobile terminal, a PC terminal, or a cloud processor.

Figure 7:
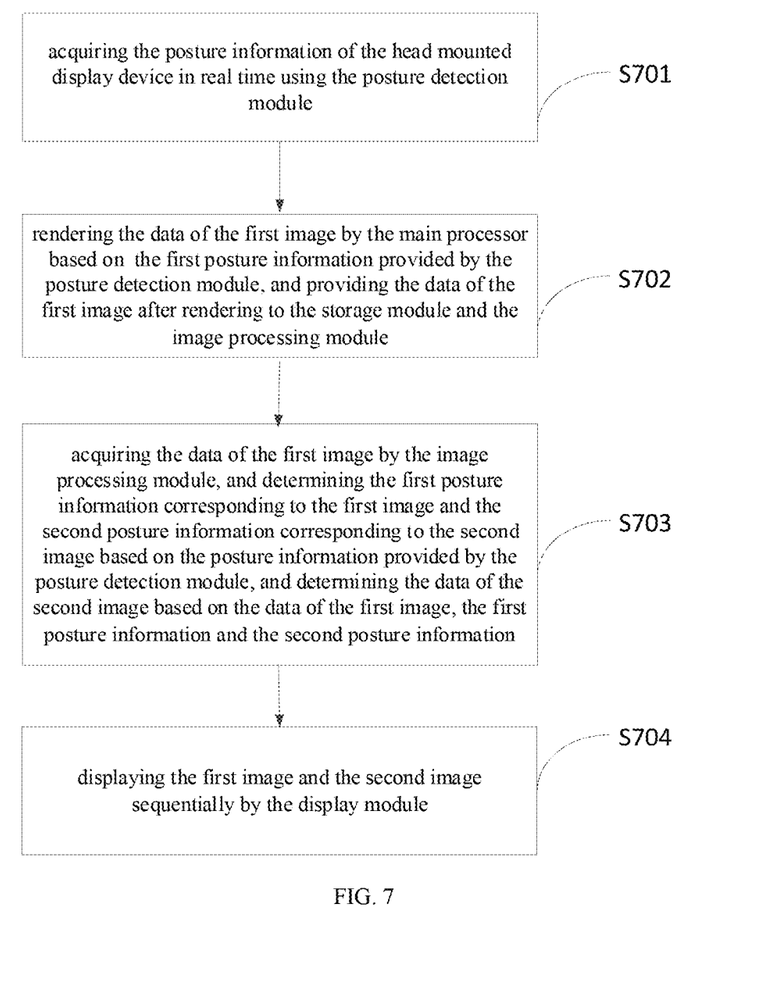
FIG. 7 is a flowchart of a driving method fora virtual reality display system according to one embodiment of the present disclosure.

As shown in FIG. 7, another embodiment of the present disclosure further provides a driving method of a virtual reality display system, including:

Step S701: acquiring the posture information of the head mounted display apparatus in real time by the posture detector.

Step S702: rendering the data of the first image by the main processor based on the first posture information provided by the posture detector, and providing the data of the first image after rendering to the storage module and the image processor.

Step S703: acquiring the data of the first image by the image processor, determining the first posture information corresponding to the first image and the second posture information corresponding to the second image based on the posture information provided by the posture detector, and determining the data of the second image based on the data of the first image, the first posture information and the second posture information. The data of the first image is provided by a main processor, and the second image is an interpolated frame image obtained by rendering the first image.

Step S704: sequentially displaying the first image and the second image by the display device.

The driving principle and the specific implementation of the driving method of the virtual reality display system are the same as or similar to the principle and the implementation of the virtual reality display system in the above embodiments. Therefore, the driving method of the virtual reality display system may refer to the implementation of the virtual reality display system in the above embodiments, and details are not repeated herein.

The present disclosure provides a head mounted display apparatus, a driving method of the head mounted display apparatus, a virtual reality display system, and a driving method of the virtual reality display system. The head mounted display apparatus includes a posture detector, an image processor, and a display device. The posture detector is used to acquire the posture information of the head mounted display apparatus in real time. The image processor is used to acquire the data of the first image, and determine the first posture information corresponding to the first image and the second posture information corresponding to the second image based on the posture information provided by the posture detector, and determine the data of the second image based on the data of the first image, the first posture information and the second posture information. The data of the first image is provided by a main processor, and the second image is an interpolated frame image obtained by rendering the first image. The display device is used to display the first image and the second image sequentially. The head mounted display apparatus can determine the data of the second image based on the data of the first image provided by the main processor, the first posture information, and the second posture information, that is, the interpolated frame image is rendered by the head mounted display apparatus, thereby reducing the amount of data that the main processor needs to process to ensure normal display at high frame rates and complex scenes.

Unless otherwise defined, technical terms or scientific terms used in the present disclosure are intended to be in the ordinary meaning of those of ordinary skill in the art. The words "first," "second" and similar words used in the present disclosure do not denote any order, quantity or importance, but are merely used to distinguish different components. The words "including" or "comprising" and the like mean that the element or the item preceding the word includes the element or item listed after the word and its equivalent and do not exclude other components or objects. "Connected" and the like are not limited to physical or mechanical connections, but may include electrical connections, whether direct or indirect. "Upper," "lower," "left," "right," etc. are only used to indicate the relative positional relationship. When the absolute position of the object being described is changed, the relative positional relationship may also change accordingly.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A driving method of a head mounted display apparatus, comprising:

acquiring posture information of a head mounted display apparatus in real time using a posture detector;

acquiring data of a first image, determining first posture information corresponding to the first image and second posture information corresponding to a second image based on the posture information provided by the posture detector, and determining data of the second image based on the data of the first image, the first posture information and the second posture information, wherein the data of the first image is provided by a main processor, and the second image is an interpolated frame image obtained by rendering the first image; and displaying the first image and the second image sequentially using a display device;

wherein determining the data of the second image based on the data of the first image, the first posture information and the second posture information includes:

performing a cropping process on a portion of the data of the first image that is outside a preset area after an offsetting, rotating, and/or scaling processing, and performing data augmentation on an image missing area in the preset area, wherein the image missing area is augmented based on boundary data of the first image adjacent to the image missing area.

2. The driving method of the head mounted display apparatus according to claim 1, wherein acquiring data of the first image, and determining the first posture information corresponding to the first image and the second posture information corresponding to the second image based on the posture information provided by the posture detector, and determining the data of the second image based on the data of the first image, the first posture information and the second posture information comprises:
  extracting the data of the first image from a storage module;
  acquiring posture change data of the second posture information with respect to the first posture information, wherein the posture change data includes at least one of a heading angle change, a pitch angle change, and a displacement amount in each direction; and
  processing the data of the first image based on the posture change data to obtain the data of the second image.

3. A head mounted display apparatus, comprising:
a display screen;
a processor;
and a non-transitory storage medium coupled to the processor and storing a computer program that, when executed by the processor, causes the processor to execute the driving method of claim 1.

4. A head mounted display apparatus, comprising:
a posture detector, configured to acquire posture information of the head mounted display apparatus in real time;
an image processor, configured to acquire data of a first image, determine first posture information corresponding to the first image and second posture information corresponding to a second image based on the posture information provided by the posture detector, and determine data of the second image based on the data of the first image, the first posture information and the second posture information; and
a display device, configured to display the first image and the second image sequentially, wherein the second image is an interpolated frame image obtained by rendering the first image; and
wherein the image processor is further configured to:
perform an offsetting, rotating, and/or scaling process on the first image in a corresponding direction based on the posture change data; and
perform a cropping process on a portion of the data of the first image that is outside a preset area after the offsetting, rotating, and/or scaling processing, and perform data augmentation on an image missing area in the preset area, wherein the image missing area is augmented based on boundary data of the first image adjacent to the image missing area.

5. The head mounted display apparatus of claim 4, further comprising: a storage module, configured to store the data of the first image provided by a main processor and the data of the second image provided by the image processor.

6. The head mounted display device according to claim 5, wherein the image processor is configured to:
  extract the data of the first image from the storage module;
  acquire posture change data of the second posture information with respect to the first posture information, wherein the posture change data includes at least one of a heading angle change, a pitch angle change, or a displacement amount in each direction; and
  process the data of the first image based on the posture change data to obtain the data of the second image.

7. The head mounted display apparatus according to claim 5, wherein the storage module comprises a memory, a hard disk, a floppy disk, or a memory chip.

8. The head mounted display apparatus according to claim 4, further comprising an anti-distortion circuit configured to perform an anti-distortion process on the data of the first image and the data of the second image and provide the data of the first image and the data of the second image after the anti-distortion process to the display device.

9. The head mounted display apparatus according to claim 4, wherein the posture detector comprises one or a combination of an inertial measuring unit, an optical sensor, a positioning unit, or a camera ranging unit.

10. The head mounted display apparatus according to claim 4, wherein the image processor comprises a field-programmable gate array, a central processing unit, a processing chip or a microcontroller unit.

11. The head mounted display apparatus according to claim 4, wherein the display device comprises a display screen, a liquid crystal display panel, an organic light emitting diode display panel, or a display device based on a liquid crystal on silicon.

12. A virtual reality display system, comprising: a main processor and the head mounted display apparatus according to claim 4 in communication with the main processor, wherein
  the head mounted display apparatus is configured to acquire the posture information of the head mounted display apparatus in real time, and provide the first posture information corresponding to the first image to the main processor; and
  the main processor is configured to render the first image according to the first posture information provided by the head mounted display apparatus, and provide the data of the first image after rendering to the head mounted display apparatus.

13. The head mounted display apparatus according to claim 12, wherein the main processor is independently set from the head mounted display apparatus.

14. The virtual reality display system of claim 12, wherein the main processor and the head mounted display apparatus perform data transmission via a data line or wirelessly.

15. The virtual reality display system according to claim 12, wherein the main processor comprises a mobile terminal, a PC terminal or a cloud processor.

16. A driving method of the virtual reality display system according to claim 12, comprising:
  acquiring the posture information of the head mounted display device in real time using the posture detector;
  rendering the data of the first image by the main processor based on the first posture information provided by the posture detector, and providing the data of the first image after rendering to a storage module and the image processor;
  acquiring the data of the first image by the image processor, determining the first posture information corresponding to the first image and the second posture information corresponding to the second image based on the posture information provided by the posture detector, and determining the data of the second image based on the data of the first image, the first posture information and the second posture information; and
  displaying the first image and the second image sequentially by the display device.

17. The driving method of the virtual reality display system according to claim 16, wherein the data of the first image is provided by the main processor, and the second image is an interpolated frame image obtained by rendering the first image by the head mounted display apparatus.

* * * * *